July 23, 1957    G. MÖHRING ET AL    2,799,913
TENTER CLIP ARRANGEMENT

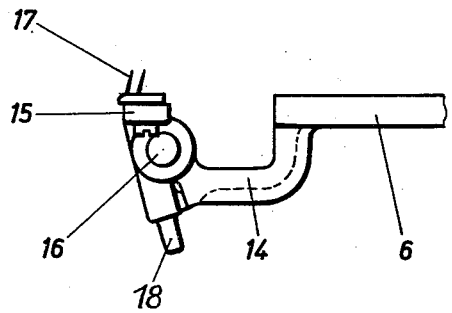
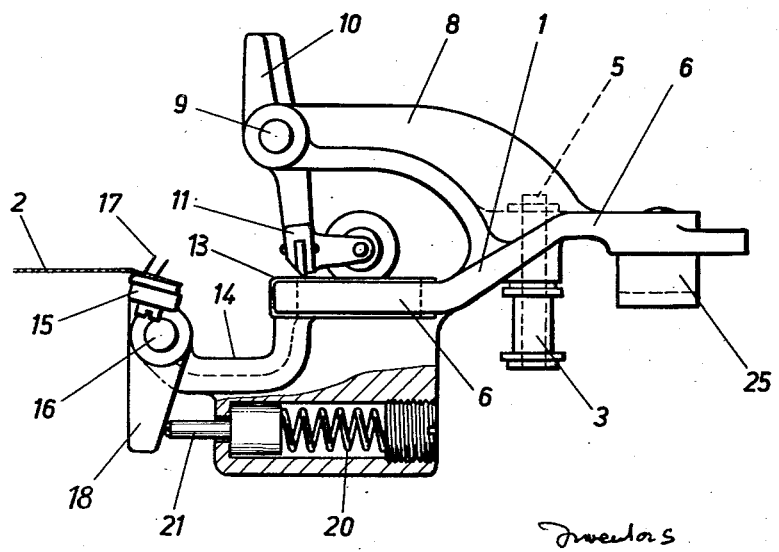

Filed March 6, 1952    3 Sheets-Sheet 3

United States Patent Office 2,799,913
Patented July 23, 1957

2,799,913

TENTER CLIP ARRANGEMENT

Gustav Möhring and Arno Weber, Stuttgart, Germany, assignors to Famatex G. m. b. H., Stuttgart-Kornwestheim, Germany Application March 6, 1952, Serial No. 275,182

Claims priority, application Germany October 4, 1951

11 Claims. (Cl. 26—57)

This invention relates to equipment for transporting whole lengths of fabric while spread out to full width and more particularly to transporting equipment as in use, for example, in the usual stretching, drying and equalizing machines and the like.

The invention consists essentially therein that the fabric holders, provided for holding the fabric fully spread as to width, are formed as members of the transporting equipment and preferably fastened to a chain of the general commercial type.

The fastening means are preferably of a kind adapted to be readily and quickly removable and consist of a pair of elongated bolts provided for connecting together the links of the transport chain, the lengths of these bolts being adequately increased, but the chain itself not altered at all.

As a rule, in the usual equipment of the character dealt with herein, the holding members themselves are so connected together that they are parts of the transport chain. Since these holding members are relatively large, ensuing shocks with resultant heavy wear are unavoidable, particularly while engaging the chain wheels. Further, the holding members are subject to the full tension load of the chain and therefore must be made of strong, hence heavy material, for example, malleable casting or the like.

The present invention has for its object to overcome these disadvantages by employing a short-link roller chain for obtaining smooth and practically shock-free engagement with the chain wheels. Simultaneously, the holding members for holding the fabric are relieved of the tension load of the chain and, consequently, and in accordance with another feature of the invention, they can now be made of light metal. Thus the weight of the equipment is considerably diminished and in consequence thereof requires substantially less power for its motion.

As a result only the pull of the fully spread width of fabric is now effective upon the holding members transversely to its motion. For the purpose of taking up this pulling force, the fabric holding members are transversely supported on a guide. In principle, either the transport chain or the fabric holding member itself may be supported. According to another feature of the invention this guiding is accomplished by means of guide elements sliding or rolling along respectively within a guide rail, or by a combination of such guide elements, since these in addition to the transverse pull, for holding the fabric fully spread as to width, also transmit the vertical pressure originating in the weight of the loaded fabric holding members and transport chain. The support of the fabric holding member should preferably be placed in level with the fabric and in a way as to place the chain between the support and the fabric holding elements.

According to another feature of the invention, in the employment of a sliding supporting element at least one of the cooperating parts is, or the corresponding faces of such parts, are made of a material having good antifrictional qualities permitting (in an emergency) operation now and then without adequate lubrication. Bronze particularly meets such purpose.

If provision is made for one only sliding element the same will then be removably mounted on the fabric holding member and so symmetrically formed as to its longitudinal axis (situated in the direction of motion) that after reaching a certain degree of wear, occurring essentially in a one-sided form, it can be turn around 180 degrees and then be used on the other side.

For the purpose of holding the fabric fully spread as to width, the fabric holding member is equipped with a clip, or with pins for piercing and holding the edge of the fabric, or with both.

In the last mentioned form of the invention the holding mechanism, according to another feature of the invention, is pivotally mounted in a manner whereby it can be swung either into a working or into a rest position. Either position is limited by stops; the stop determining the working position being either a stationary or an elastic one.

Other objects and features of our invention will be seen from the following description of the forms of our invention which we have chosen to illustrate the features, principles, and advantages thereof.

Referring to the drawings:

Fig. 3 is a detail view of a part shown in Fig. 1,

Fig. 4 is a side elevation of a second form of the invention,

Figure 1:
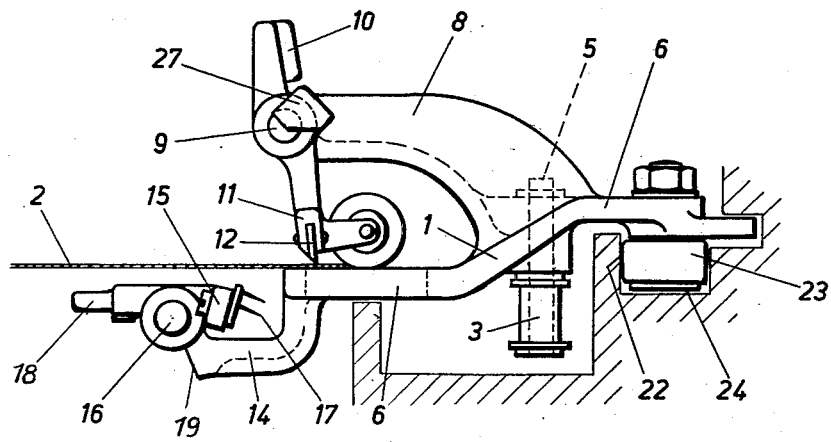
Fig. 1 is a side elevation of the fabric holder provided by the invention.

The fabric transport equipment according to the invention consists essentially of two rows of holding members 1 symmetrically arranged opposite each other which grip a width of fabric 2 by means of a suitable holding mechanism and which hold it fully spread between each other. The holding members 1 of each row are arranged on a transport chain 3 which is driven and guided by means of suitable chain wheels (not shown on the drawings). A short-linked roller chain of known form ensuring smooth and shock-free engagement of the chain wheels is used as transport chain.

The side plates 4 of the transport chain are maintained in proper spaced relationship by means of rollers or sleeves, and are connected together by means of bolts 5 which extend through the sleeves and side plates. The fabric holder 1 receives two adjacent bolts 5 of the chain 3, which differ from the other bolts 5 of the transport chain only in that they are longer. These special bolts extend toward the holder 1 and pass through corresponding bores in the base plate 6 of the holder 1. The ends of the bolts 5 extending beyond the bores are preferably so locked that they can be readily and quickly released. As such locking and fastening means a chain lock 7 is indicated on the drawing.

In the arrangement of holding member and chain hereinbefore described, the chain takes up the entire tension load in the direction of its motion and the holding member, relieved of this force, can now be made of light metal.

Pivotally mounted on a supporting bracket 8—which may be alternately formed by one arm (as in Fig. 2) or by two arms (as in Fig. 5) by up bends from the base plate 6—is a mechanism for holding the fabric 2, for example, a double-armed clamping lever 10 that can be swung about an axle 9 arranged parallelly to the length of fabric. The arm 11, of this lever 10, pointing toward the base plate 6 clamps the fabric between its front edge and the base plate.

Instead of such a clamping mechanism there is frequently used a hooking mechanism which pierces and holds the fabric by means of needles.

It is, furthermore, usual to provide both the clamping and the hooking mechanisms to be operated at will.

In such a case the hooking mechanism according to the invention consists of a pivoted lever 15 preferably formed (so seen in side view) as double lever and pivotally mounted on a suitable bracket 14 so that it can be swung about an axle 16 arranged parallelly to the length of fabric 2. This lever 15, on one of its ends, carries needles 17 preferably upstanding from a so-called needle bar by which they are fastened to said lever 15.

The other end of the lever 15 is provided with a short extension 18 adapted for swinging it by means of suitable controlling elements about the axle 16.

This lever with its needle points serves as hooking mechanism for hooking the edge of the fabric. In its hooking or working position, the lever 15 is so disposed that the needles 17 pierce the fabric with a slight inclination toward the edge of the fabric.

Furthermore, the arm of the lever 15, carrying the needles 17, is heavier proportioned than the extension 18 and the arrangement is most desirably of a type that the center of gravity of the hooking mechanism, in the working position, will be located on the fabric side next to the perpendicular passing through the fulcrum.

Instead of securing the position of the lever by the center of gravity arrangement there may, under certain circumstances, be employed additional means, such as detents and the like.

In order to prevent the lever 15, in the working position, from swinging so far out of the way by the pull of the fabric in the direction of its width that the fabric would leave (slip off) the needles, a stop 19 is provided. In the form of the invention according to Fig. 1 this stop 19 is formed integrally with the bracket 14 and co-operates with a counterstop formed on the extension 18 of the lever 15.

The pivotal mounting of the lever 15 serves chiefly for the purpose of removing the needles 17 out of the range of the fabric 2, if the fabric is to be held fully spread as to width by means of the clamping mechanism 11, because otherwise the fabric could be damaged. To this end the lever 15 is swung away from the fabric into its rest position shown in Fig. 1. In connection with this the lever 15 abuts against the upper face of its bracket 14 and the needles are preferably pointed somewhat downwardly inclined. Owing to the unbalance (excess weight) of the particular end of the lever 15, carrying the needles 17, it holds itself in a thoroughly stabilized position.

In order to facilitate the desired removal of the length of fabric from the hooking mechanism, after its processing, the stop for limiting the working position may, if necessary, be spring-loaded in a manner whereby the needles may be placed perpendicular as to the length of fabric against the action of a spring. To this end a stop pin 21, affected by a spring 20, is, for example, according to Fig. 4, accommodated in a suitable housing below the bracket 14 on the fabric holder 1. This stop pin holds the lever 15 in such a position that the needles are outwardly inclined, as clearly shown in Fig. 4. For the purpose of removing the fabric, the hooking mechanism is then put by means of a suitable controlling element into the perpendicular position of the needles hereinbefore described. In addition thereto the fixed stop 19 may, of course, also be provided as counterstop.

For the purpose of taking up the transverse pull exerted by the length of fabric 2 upon the holding member 1, the latter is provided, in the plane of the fabric, with a supporting element sliding or rolling on or in a guide rail.

The arrangement is preferably one in which the transport chain moves between the clamping or hooking mechanism and the supporting element.

Figure 2:
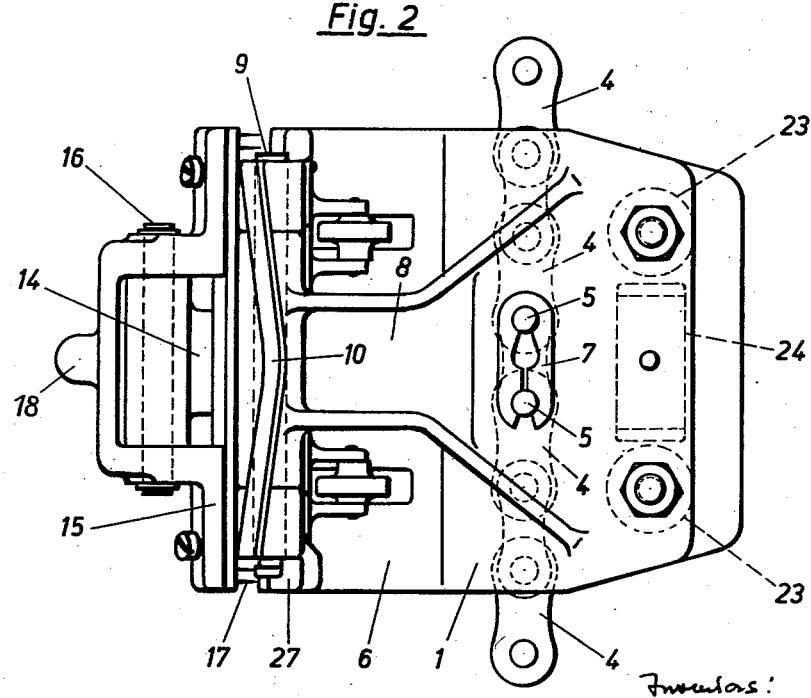
Fig. 2 is a top plan view of the same holder.

According to Figs. 1 and 2 the combination of, for example, two rollers 23 mounted in ball bearings and, for example, a slide member 24 serves as supporting element. This supporting element moves in a channel-shaped rail 22 in that the rollers 23 move along the side wall of the rail which faces the fabric, whereas the slide member 24 slides on the bottom of the channel 22 and serves for supporting the weight of the chain 23 and the weight of the fabric holding member 1 which with its base plate 6 slides on another sliding surface on the other side of the chain 3.

The slide member 24 on its working side is advantageously provided with a separate bearing surface made of a material having good anti-frictional qualities permitting (in an emergency) also trouble-free operation without adequate lubrication in the event of malfunction or breakdown of the lubricating system. Bronze is particularly adapted for such purpose. The slide member may, of course, be made entirely of bronze if occasion arises.

Figure 5:
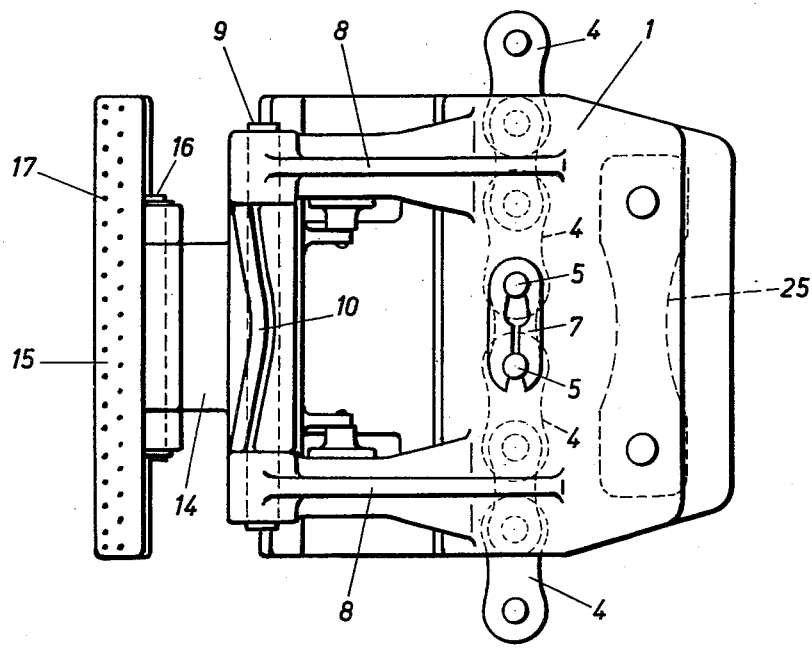
Fig. 5 is a top plan view of that which is shown in Fig. 4.

In the construction of the invention illustrated in Figs. 4 and 5 the supporting element as an entirety is formed as slide member 25 and symmetrically as to its longitudinal axis and adapted to be removably mounted on the base plate 6 of the fabric holder 1. In an advanced state of wear of its lateral bearing surface the slide member 25, owning to its symmetrical form, may be removed and turned round 180 degrees and then be used on the other side.

Figure 6:
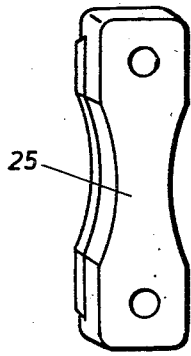
Fig. 6 is a detail view of a part shown in Fig. 5.

Also the slide member 25 may be made entirely of bronze, or provided with separate slide plate of bronze as shown in Fig. 6.

Under certain circumstances it may be useful to provide the guide rail, instead of the slide member, with separate bronze bearing surfaces.

The arrangement and the specific form of the supporting element above described may, under certain circumstances, also be employed in cases where the holding member is not mounted on a separate transport chain, but constitutes in itself a member of a transport chain. Even in the latter case the arrangement of the pivotally mounted lever 15 according to the form of the invention Figs. 1 and 4 may be utilized.

Figure 7:
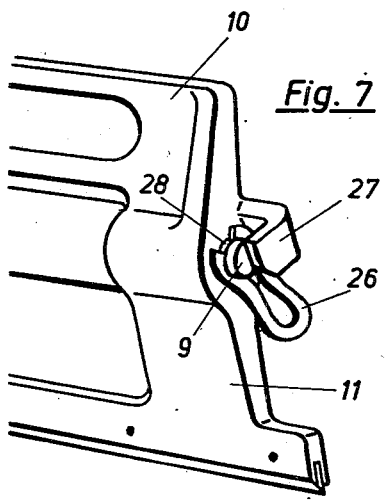
Fig. 7 is a detail view of a part shown in Figs. 1 and 2.

The fulcrum pins 9 and 16 of the clamping and hooking mechanisms are adapted to be readily and quickly interchangeable, and for such purpose preferably provided at either end with annular grooves to be engaged with initial tension by a forked locking spring 26 (of which the closed end is adapted to serve as handle) of the kind generally used for the locking of chain pins. Instead of the above, the pin 9 of the clamping mechanism—as shown in Fig. 7—may be provided at one end only with an annular groove 28 and a forked locking spring 26 which prevent the pin from moving too far into the bore, whereas the bracket 10, on the same side, is provided with a lug 27 which is so bent up that its bent part is located in front of the end of the pin 9 and prevents it from moving outwards.

Various modifications in the construction and arrangement of parts hereinbefore described will be apparent and may readily be made without departing from the spirit of the present invention. For example, the spring-loaded stop 20, 21 of the hooking mechanism according to Fig. 4 may also be used in conjunction with the rolling support of the holding member according to Figs. 1 and 2.

Under certain circumstances one or more rollers and one or more slide members may be provided as supporting element for each fabric holding member 1. Similarly the end face of the fulcrum pin for the roller or rollers may serve as slide member. Furthermore, roller and slide member need not be arranged side by side respectively juxtaposed in the direction of motion.

Further, the base plate 6 of the holding member 1 may advantageously be proportioned so heavy that the usual bolts for double chains of known form may be used for fastening it to the transport chain.

It is intended that the patent shall cover, by suitable expression in the appended claims, whatever features of patentable novelty reside in the invention.

What we claim is:

1. Arrangement for connecting a tenter clip to a conveyor chain comprising, in combination, an attaching body portion forming part of said tenter clip and having two parallel apertures passing therethrough opening in opposite faces of said attaching body portion; two connecting sleeves forming part of said conveyor chain and being formed with an axial hole, each of said sleeves being located adjacent one of said opposite faces of said attaching body portion with the axial hole therein in register with one of said apertures in said body portion; two bolts, each being longer than the combined length of one of said holes in said sleeves and one of said apertures in said attaching body portion and passing through the axial hole in one of said sleeves and through one of said parallel apertures in said attaching body portion so as to have a projecting portion beyond the other of said opposite faces of said attaching body portion; and means securing said projecting portions of said bolts to each other.

2. Arrangement for connecting a tenter clip to a conveyor chain comprising, in combination, an attaching body portion forming part of said tenter clip and having two parallel apertures passing therethrough opening in opposite faces of said attaching body portion; two connecting sleeves forming part of said conveyor chain and being formed with an axial hole, each of said sleeves being located adjacent one of said opposite faces of said attaching body portion with the axial hole therein in register with one of said apertures in said body portion; two bolts, each being longer than the combined length of one of said holes in said sleeves and one of said apertures in said attaching body portion and passing through the axial hole in one of said sleeves and through one of said parallel apertures in said attaching body portion so as to have a projecting portion beyond the other of said opposite faces of said attaching body portion; and removable means releasably securing said projecting portions of said bolts to each other.

3. A tenter device for attachment to a conveyor chain comprising, in combination, a tenter clip comprising an attaching body portion forming part of said tenter clip and having two parallel apertures passing therethrough opening in opposite faces of said attaching body portion, said tenter clip having a material holding portion and a bearing means on opposite sides of said attaching body portion; two connecting sleeves forming part of said conveyor chain and being formed with an axial hole, each of said sleeves being located adjacent one of said opposite faces of said attaching body portion with the axial hole therein in register with one of said apertures in said body portion; two bolts, each being longer than the combined length of one of said holes in said sleeves and one of said apertures in said attaching body portion and passing through one of said parallel apertures in said attaching body portion so as to have a projecting portion beyond the other of said opposite faces of said attaching body portion; and removable means releasably securing said projecting portions of said bolts to each other.

4. A tenter device for attachment to a conveyor chain comprising, in combination, a tenter clip comprising an attaching body portion forming part of said tenter clip and having two parallel apertures passing therethrough opening in opposite faces of said attaching body portion, said tenter clip having a material holding portion and a bearing means on opposite sides of said attaching body portion, said bearing means comprising anti-friction means projecting from one of the faces of said body portion and adapted to engage a stationary bearing surface facing away from said holding means and extending parallel to the direction of movement of the chain for counteracting the pull of the material on said tenter clip laterally of the chain; two connecting sleeves forming part of said conveyor chain and being formed with an axial hole, each of said sleeves being located adjacent one of said opposite faces of said attaching body portion with the axial hole therein in register with one of said apertures in said body portion; two bolts, each being longer than the combined length of one of said holes in said sleeves and one of said apertures in said attaching body portion and passing through the axial hole in one of said sleeves and through one of said parallel apertures in said attaching body portion so as to have a projecting portion beyond the other of said opposite faces of said attaching body portion; and removable means releasably securing said projecting portions of said bolts to each other.

5. A tenter device for attachment to a conveyor chain comprising, in combination, a tenter clip comprising an attaching body portion forming part of said tenter clip and having two parallel apertures passing therethrough opening in opposite faces of said attaching body portion, said tenter clip having a material holding portion and a bearing means on opposite sides of said attaching body portion, said bearing means comprising roller bearing means projecting from one of the faces of said body portion and adapted to roll in contact with a stationary bearing surface facing away from said holding means and extending parallel to the direction of movement of the chain for counteracting the pull of the material on said tenter clip laterally of the roller chain; two connecting sleeves forming part of said conveyor chain and being formed with an axial hole, each of said sleeves being located adjacent one of said opposite faces of said attaching body portion with the axial hole therein in register with one of said apertures in said body portion; two bolts, each being longer than the combined length of one of said holes in said sleeves and one of said apertures in said attaching body portion and passing through the axial hole in one of said sleeves and through one of said parallel apertures in said attaching body portion so as to have a projecting portion beyond the other of said opposite faces of said attaching body portion; and removable means releasably securing said projecting portions of said bolts to each other.

6. A tenter device, comprising, in combination, a supporting member having opposite end portions and a central body portion adapted to be connected to a chain extending and movable in a direction lateral of said supporting member; holding means on one of said opposite end portions for gripping the edge portion of a web of material, said holding means comprising a plate member and a pivotable clamping member attached to said body portion for receiving and clamping the edge portion of the web of material therebetween so as to hold the same in a predetermined working plane, and a material hooking member projecting from said plate member on the other side thereof opposite said clamping member for hooking into the web of material so as to hold the same substantially in said predetermined working plane; and bearing means on the other of said opposite end portions of said supporting member adapted to engage a stationary bearing surface facing away from said holding means and extending parallel to the direction of movement of the chain for counteracting the pull of the material on said supporting member laterally of the chain.

7. A tenter device, comprising, in combination, a supporting member having opposite end portions and a central body portion adapted to be connected to a chain extending and movable in a direction lateral of said supporting member; holding means on one of said opposite end portions for gripping the edge portion of a web of material, said holding means comprising a plate member and a pivotable clamping member attached to said body portion for receiving and clamping the edge portion of the web of material therebetween so as to hold the same in a predetermined working plane, and a pivotable material hooking member projecting from said plate member on the other side thereof opposite said clamping member and having pin means for hooking into the web of material so as to hold the same substantially in said working plane, said hooking member being pivotable to an inoperative position with said pin means arranged below the plane of said plate member, and to an operative position with said pin means projecting above said plane for penetrating the web of material; and bearing means on the other of said opposite end portions of said supporting member adapted to engage a stationary bearing surface facing away from said holding means and extending parallel to the direction of movement of the chain for counteracting the pull of the material on said supporting member laterally of the chain.

8. A device such as defined in claim 7, wherein said hooking member comprises a lever arm having said pin means at one end thereof and pivotable about a horizontal axis arranged intermediate its ends, the end carrying said pin means being heavier than the opposite end, said lever arm being arranged for turning on said horizontal axis so that said hooking member is held in its operative position and inoperative position by the weight of said end carrying said pin means.

9. In a tenter device, a hooking arrangement for holding a sheet in a working plane, in combination, a support; and a lever arm having pin means at one end thereof, said lever arm being mounted on said support for pivotal movement about a horizontal axis between an operative position wherein said pin means extends into said working plane and an inoperative position wherein said pin means is spaced from said working plane, said lever arm being shaped and mounted so that the center of gravity thereof is on one side of a vertical plane passing through said horizontal axis when said lever arm is in one of its positions and the center of gravity of said lever arm is on the other side of said vertical plane when said lever arm is in the other of its positions.

10. In a tenter device, a hooking arrangement for holding a sheet in a working plane, in combination, a support; a lever arm having pin means at one end thereof, said lever arm being mounted on said support for pivotal movement about a horizontal axis between an operative position wherein said pin means extends into said working plane and an inoperative position wherein said pin means is spaced from said working plane, said lever arm being shaped and mounted so that the center of gravity thereof is on one side of a vertical plane passing through said horizontal axis when said lever arm is in one of its positions and the center of gravity of said lever arm is on the other side of said vertical plane when said lever arm is in the other of its positions; and stop means operatively associated with said support and said lever arm for limiting movement of the latter to movement between said operative and inoperative positions thereof.

11. In a tenter device, a hooking arrangement for holding a sheet in a working plane, in combination, a support; a lever arm having pin means at one end thereof said lever arm being mounted on said support for pivotal movement about a horizontal axis between an operative position wherein said pin means extends into said working plane and an inoperative position wherein said pin means is spaced from said working plane, said lever arm being shaped and mounted so that the center of gravity thereof is on one side of a vertical plane passing through said horizontal axis when said lever arm is in one of its positions and the center of gravity of said lever arm is on the other side of said vertical plane when said lever arm is in the other of its positions; and resilient stop means operatively associated with said support and said lever arm for limiting movement of the latter toward said operative position thereof.

References Cited in the file of this patent

UNITED STATES PATENTS

| | | |
|---|---|---|
| 1,832,420 | Peterson | Nov. 17, 1931 |
| 1,907,090 | Peterson | May 2, 1933 |
| 2,065,913 | Weber | Dec. 29, 1936 |
| 2,102,026 | Peterson | Dec. 14, 1937 |
| 2,285,820 | MacKnight | June 6, 1942 |
| 2,437,967 | Nash | Mar. 16, 1948 |
| 2,446,131 | Deck | July 27, 1948 |
| 2,530,118 | Dungler | Nov. 14, 1950 |
| 2,530,119 | Dungler | Nov. 14, 1950 |
| 2,589,060 | Deck | Mar. 11, 1952 |
| 2,736,082 | Dungler | Feb. 28, 1956 |